US 9,137,291 B2

(12) United States Patent
Church

(10) Patent No.: US 9,137,291 B2
(45) Date of Patent: Sep. 15, 2015

(54) METHOD, SYSTEM AND APPARATUS FOR PROCESSING ALERTS AND ACKNOWLEDGMENTS

(71) Applicant: Research in Motion Limited, Waterloo (CA)

(72) Inventor: Mark Edward Church, Waterloo (CA)

(73) Assignee: BLACKBERRY LIMITED, Waterloo, Ontario (CA)

(*) Notice: Subject to any disclaimer, the term of this patent is extended or adjusted under 35 U.S.C. 154(b) by 271 days.

(21) Appl. No.: 13/723,226

(22) Filed: Dec. 21, 2012

(65) Prior Publication Data

US 2014/0181242 A1 Jun. 26, 2014

(51) Int. Cl.
 *G06F 15/16* (2006.01)
 *H04L 29/08* (2006.01)

(52) U.S. Cl.
 CPC ........................................ *H04L 67/02* (2013.01)

(58) Field of Classification Search
 USPC .......................................... 709/217; 345/163
 See application file for complete search history.

(56) References Cited

U.S. PATENT DOCUMENTS

| 7,475,395 | B2 | 1/2009 | Etelapera |
| 7,925,990 | B2 | 4/2011 | Bedingfield, Sr. |
| 2003/0023690 | A1 | 1/2003 | Lohtia |
| 2007/0285390 | A1* | 12/2007 | Yee et al. ...................... 345/163 |

FOREIGN PATENT DOCUMENTS

| EP | 1798947 A1 | 6/2007 |
| EP | 1903748 A2 | 3/2008 |

OTHER PUBLICATIONS

Cult of Mac—Apple finally fixes how annoying notifications across Multiple Devices are in iOS 6; John Brownlee—Jun. 13, 2012; downloaded from http://www.cultofmac.com/173516/in-ios-6-apple-finally-fixes-how-annoying-notifications-across-multiple-devices-are/.
Corresponding European Patent Application No. 12199054.3 dated Mar. 6, 2013.

* cited by examiner

*Primary Examiner* — Kyung H Shin
(74) *Attorney, Agent, or Firm* — Perry + Currier Inc.

(57) ABSTRACT

According to embodiments described in the specification, a method, system and apparatus for processing alerts and acknowledgments is provided. The method, in a communication device having a processor, a memory, an input device and an output device, comprises: detecting a notification message at the processor; determining whether the communication device is a primary device; and, when the determination is affirmative: controlling the output device with the processor to generate an alert; receiving an acknowledgement at the processor from the input device; and transmitting an acknowledgment message to an other communication device for causing the other communication device to interrupt alert generation.

13 Claims, 6 Drawing Sheets

METHOD, SYSTEM AND APPARATUS FOR PROCESSING ALERTS AND ACKNOWLEDGMENTS

FIELD

The specification relates generally to notifications generated by communication devices, and specifically to a method, system and apparatus for processing notification acknowledgments.

BACKGROUND

Multiple communication devices (e.g. smart phones, laptop computers, tablet computers and the like) can be associated with the same accounts (for example, email accounts). Such communication devices can be configured to generate alerts in response to new emails, or other communications, including telephone calls and the like. The generation of alerts for the same email at multiple devices can lead to inefficient use of device resources.

BRIEF DESCRIPTIONS OF THE DRAWINGS

Embodiments are described with reference to the following figures, in which.

DETAILED DESCRIPTION OF THE EMBODIMENTS

According to an aspect of the specification, a method is provided in a communication device having a processor, a memory, an input device and an output device, the method comprising: detecting a notification message at the processor; determining whether the communication device is a primary device; and, when the determination is affirmative: controlling the output device with the processor to generate an alert; receiving an acknowledgement at the processor from the input device; and transmitting an acknowledgment message to an other communication device for causing the other communication device to interrupt alert generation.

According to another aspect of the specification, a non-transitory computer readable medium is provided storing computer readable instructions executable by a processor of a communication device for performing the above method.

According to another aspect of the specification, a communication device is provided, comprising: a memory; an input device; an output device; and a processor interconnected with the memory, the input device and the output device; the processor configured to: detect a notification message; determine whether the communication device is a primary device; when the determination is affirmative: control the output device to generate an alert; receive an acknowledgement from the input device; and transmit an acknowledgment message to an other communication device for causing the other communication device to interrupt alert generation.

According to another aspect of the specification, a communication device is provided, comprising: a memory; an input device; an output device; and a processor interconnected with the memory, the input device and the output device; the processor configured to: connect to an other device over a first connection; detect a notification message; control the output device to generate an alert; receive an acknowledgement from the input device; determine that a second connection to the other device is available, the second connection having a lower latency than the first connection; and transmit an acknowledgment message to the other communication device over the second connection, for causing the other communication device to interrupt alert generation.

Figure 1:
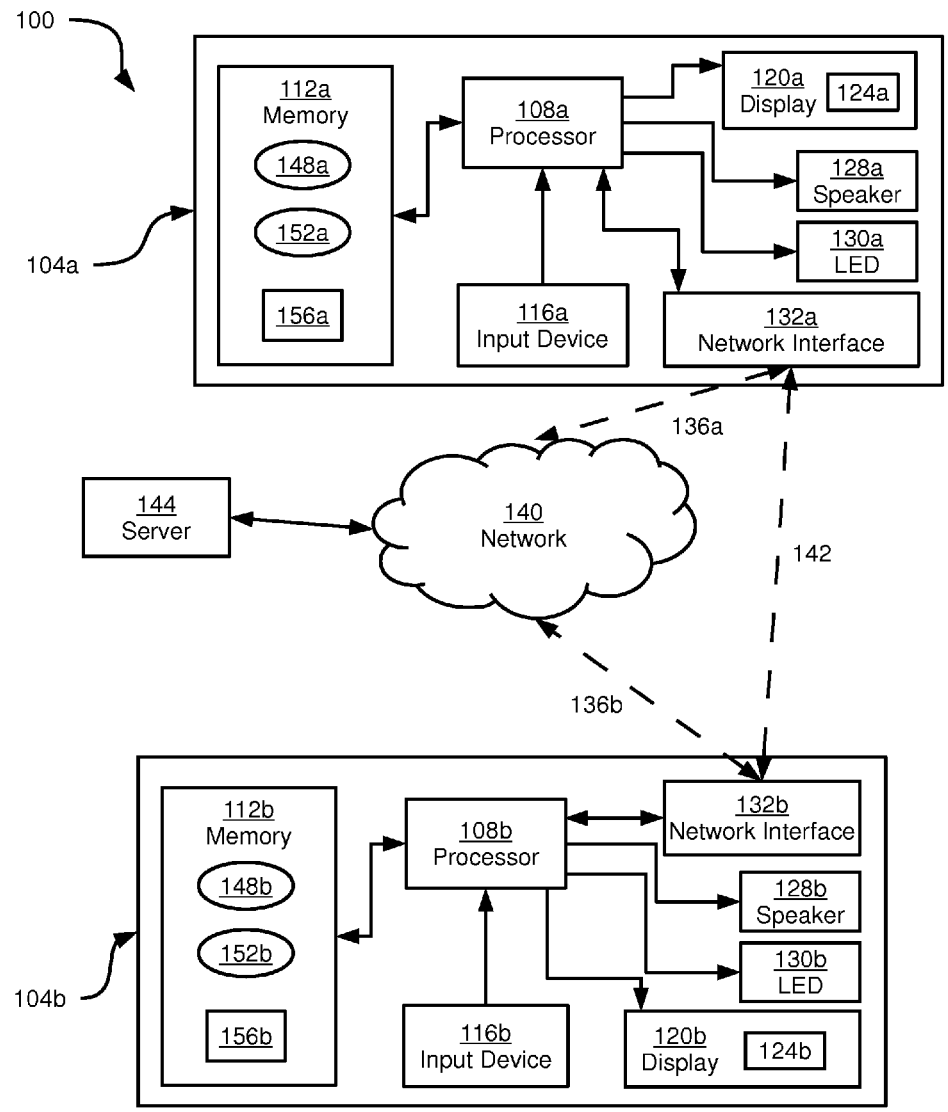
FIG. 1 depicts a communication system, according to a non-limiting embodiment.

FIG. 1 depicts a communications system 100. System 100 includes a first communication device 104a, and a second communication device 104b. In the present example, devices 104a and 104b (sometimes referred to generically as "devices 104" herein) are based on the computing environment and functionality of a portable wireless communication device. Devices 104 can therefore be, for example, cellular telephones, smartphones, Personal Digital Assistants ("PDAs"), media (e.g. MP3) players, laptop computers, tablet computers, smart televisions, and the like. It is contemplated that device 104a and device 104b can be different types of mobile communication device. In the present example, device 104a is a smartphone, while device 104b is a tablet computer. In other examples, one or both of devices 104 can be substituted by other communication devices, such as a desktop computer.

Communication device 104a includes a processor 108a interconnected with a non-transitory computer readable storage medium such as a memory 112a. Memory 112a can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In the present example, memory 112a includes both a volatile memory and a non-volatile memory. Other types of non-transitory computer readable storage medium are also contemplated, such as compact discs (CD-ROM, CD-RW) and digital video discs (DVD).

Communication device 104a also includes one or more input devices 116a interconnected with processor 108a. Such input devices are configured to receive input and provide data representative of such input to processor 108a. Input devices can include any one of, or any combination of, a keypad, a touch pad, a touch screen, a microphone, other sensors (e.g. light, temperature), and the like. A keypad, for example, can receive input in the form of the depression of one or more keys, and can then provide data representative of such input to processor 108a. The data provided to processor 108a can be, for example, an identification of which key was depressed (such as row and column numbers indicating the position of the key on the keypad). Such a keypad can be a full QWERTY keypad, a reduced QWERTY keypad or any other suitable arrangement of keys. As a further example, a touch pad or touch screen can receive input in the form of depression or swipe gestures along the surface thereof, and can then provide data representative of such input to processor 108a in the form of, for example, coordinates representing the location of a virtual cursor, the direction and/or velocity of a swipe gesture, and the like.

Communication device 104a further includes one or more output devices. The output devices of communication device 104a include a display 120a. Display 120a includes display circuitry 124a controllable by processor 108a for generating interfaces which include representations of data and/or applications maintained in memory 112a. Display 120a includes a flat panel display comprising any one of, or any suitable combination of, a Liquid Crystal Display (LCD), a plasma display, an Organic Light Emitting Diode (OLED) display, and the like. Circuitry 124a can thus include any suitable combination of display buffers, transistors, LCD cells, plasma cells, phosphors, LEDs and the like. When the input devices of communication device 104a include a touch screen input device, the touch screen can be integrated with display 120a.

The output devices of communication device 104a can also include a speaker 128a interconnected with processor 108a. Additional output devices are also contemplated including, for example, a light-emitting indicator in the form of a Light-Emitting Diode (LED) 130a, and a motor or other mechanical output device (not shown) for causing communication device 104a to vibrate. In general, communication device 104a can include any suitable combination of the above-mentioned output devices, and may also include other suitable output devices.

Communication device 104a also includes a network interface 132a interconnected with processor 108a. Network interface 132a allows communication device 104a to communicate with other computing devices via a link 136a and a network 140, or via a direct, local connection. Network 140 can include any suitable combination of wired and/or wireless networks, including but not limited to a Wide Area Network (WAN) such as the Internet, a Local Area Network (LAN), cell phone networks, WiFi networks, WiMax networks and the like. Link 136a is compatible with network 140. In particular, link 136a can be a wireless link based on any of the Global System for Mobile communications (GSM), General Packet Radio Service (GPRS), Enhanced Data rates for GSM Evolution (EDGE), third and fourth-generation mobile communication system (3G and 4G), Institute of Electrical and Electronic Engineers (IEEE) 802.11 (WiFi) or other wireless protocols or standards. Link 136a can also include any base stations and backhaul links necessary to connect communication device 104a to network 140.

Network interface 132a can also allow communication device 104a to communicate with other computing devices via a local link 142, such as a Bluetooth™ link.

Network interface 132a is selected for compatibility with link 136a and network 140, as well as with local links such as Bluetooth™. Network interface 132a thus includes one or more transmitter/receiver assemblies, or radios, and associated circuitry. For example, network interface 132a can include a first assembly, or radio, for enabling communications over a WiFi network, and a second radio for enabling communications over one or more mobile telephone networks (e.g. 3G networks). In other embodiments, link 136a can be a wired link, such as an Ethernet link, and network interface 132a can include suitable hardware for communicating over such a link.

Communication device 104a can receive communications from, and send communications to, other communication devices over link 136a and network 140. For example, device 104a can communicate with device 104b (either via network 140 or via local link 142), and with a server 144 included in system 100. The nature of the communications between communication device 104a and other computing devices is not particularly limited, and can include, for example, telephone calls, emails, Short Message Service (SMS) messages, Instant Message (IM) messages, and the like.

The various components of communication device 104a are contained within a housing (not shown) comprising any suitable combination of materials (e.g. aluminum, plastics, and the like). The components of communication device 104a are interconnected via a communication bus (not shown). Communication device 104a can be powered by a battery (not shown) contained within the housing, although it will be understood that communication device 104a can also be supplied with electricity by a wired connection to a wall outlet or other power source, for example when docked. In other embodiments, where communication device 104a takes the form of a desktop computer, certain components need not be contained within the same housing. For example, display 120a and input device 116a can each be housed separately from an enclosure housing processor 108a and memory 112a.

Communication device 104a maintains, in memory 112a, a plurality of computer readable instructions executable by processor 108a. Such instructions include an operating system and a variety of applications. For example, as illustrated in FIG. 1, communication device 104a stores a notification application 148a and a messaging application 152a, which in the present example is an email application. As will be discussed in greater detail below, a primary device indicator 156a is also stored in memory 112a.

When processor 108a executes the instructions of application 148a or 152a, processor 108a is configured to perform various functions implemented by the computer readable instructions of the respective applications. It is contemplated that memory 112a can store a variety of additional applications, such as a calendar application, a telephony application, a web browsing application, and the like (not shown). In the present example, it is contemplated that application 148a is a component of the operating system of communication device 104a, though in other examples application 148a can be a separate, standalone application.

Processor 108a is configured, via the execution of application 152a, to send and receive email messages associated with an account maintained by server 144. When a new message is received at processor 108a from server 144 via network interface 132a, processor 108a is configured, via the execution of notification application 148a, to generate one or more notification signals (also referred to herein as alerts) by controlling the output devices of communication device 104a. The alerts are external indications (e.g. to a user of device 104a) that a new message has been received. It is contemplated that alerts can also be generated in response to activity in connection with other applications. For example, processor 108a can be configured to generate a reminder of a calendar appointment from a calendar application, and to generate an alert for the reminder using application 148a.

Communication device 104b includes components similar to those discussed above in connection with device 104a, and like components of device 104b are numbered in the same way as equivalent components of device 104a, except that the suffix "b" is used instead of "a". Thus, device 104b includes a processor 108b, a memory 112b, one or more input devices 116b, a display 120b with display circuitry 124b, a speaker 128b, an LED 130b, and a network interface 132b connecting device 104b to network 140 via a link 136b. These components are as described above in connection with their similarly numbered counterparts of device 104a. It is contemplated, however that device 104b need not include the same combinations of input and output devices. For example, while device 104a may include a keypad and a touchpad, device 104b may omit the keypad and touchpad, and instead include a touch screen integrated with display 120b.

In addition, memory 112b stores a notification application 148b, a messaging application 152b, and a primary device indicator 156b, and processor 108b is configured to receive messages from server 144 via the execution of application 152b, and to generate alerts via the execution of application 148b. It is assumed that device 104b is configured to receive messages from server 144 in connection with the same account as device 104a. In other words, the same email account is associated with both devices 104a and 104b. Thus, when a message is received from an originator (not shown) at server 144 addressed to that account, server 144 is configured to deliver the message to both devices 104a and 104b. As a result, devices 104a and 104b are said to be associated with each other.

Figure 2:
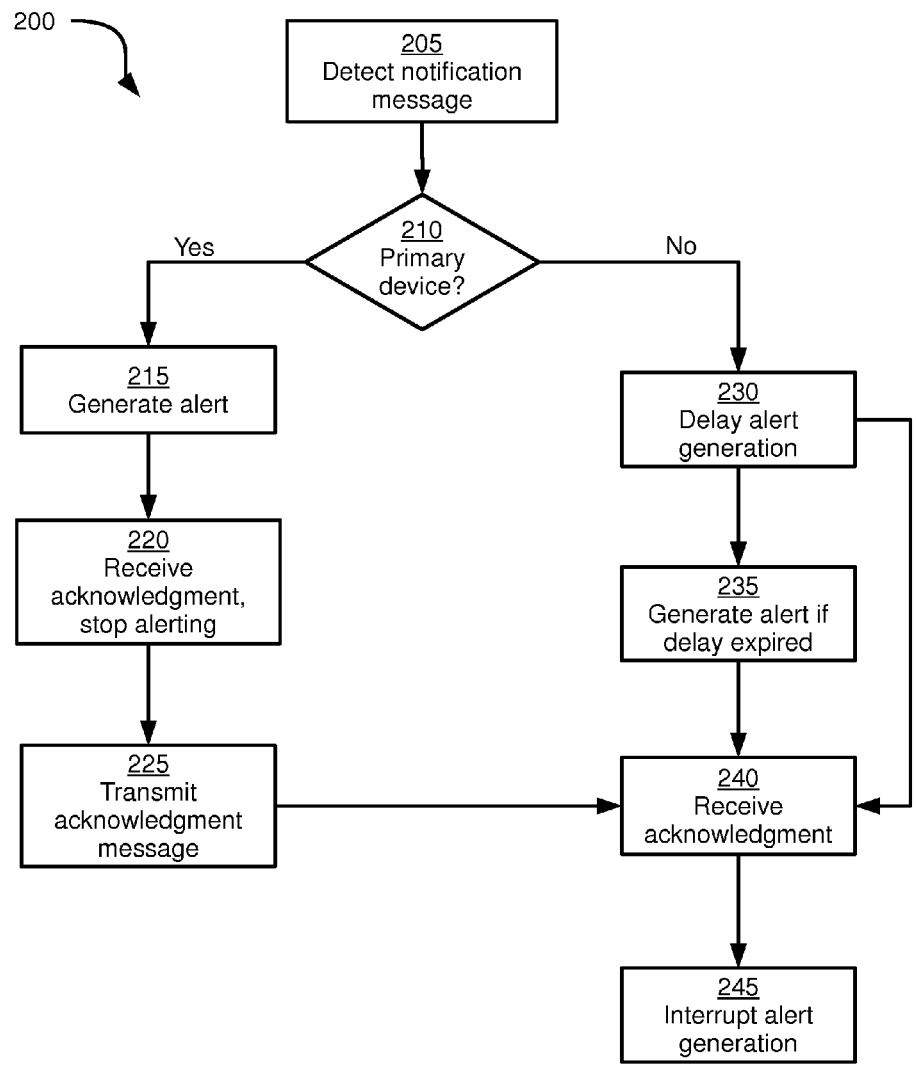
FIG. 2 depicts a method of processing alerts and acknowledgments, according to a non-limiting embodiment.

As will be discussed in greater detail below, each of devices 104a and 104b are configured, via execution of applications 148a and 148b, to influence the generation of alerts by the other device under certain circumstances. Turning to FIG. 2, a flowchart illustrating a method 200 of processing alerts and acknowledgments is shown. Method 200 can be performed on either or both of device 104a and device 104b. Each device 104 performs method 200 by way of processor 108a or 108b executing the instructions of application 148a or 148b. In the discussion below, the performance of method 200 on device 104a will be described, followed by the performance of method 200 on device 104b.

Beginning at block 205, processor 108a is configured to detect a notification message. The notification message can be generated by processor 108a itself, via the execution of messaging application 152a, and can indicate that a new email has been received at device 104a from server 144. The notification message, once detected, can be stored in memory 112a for a predetermined time period.

Figure 3:
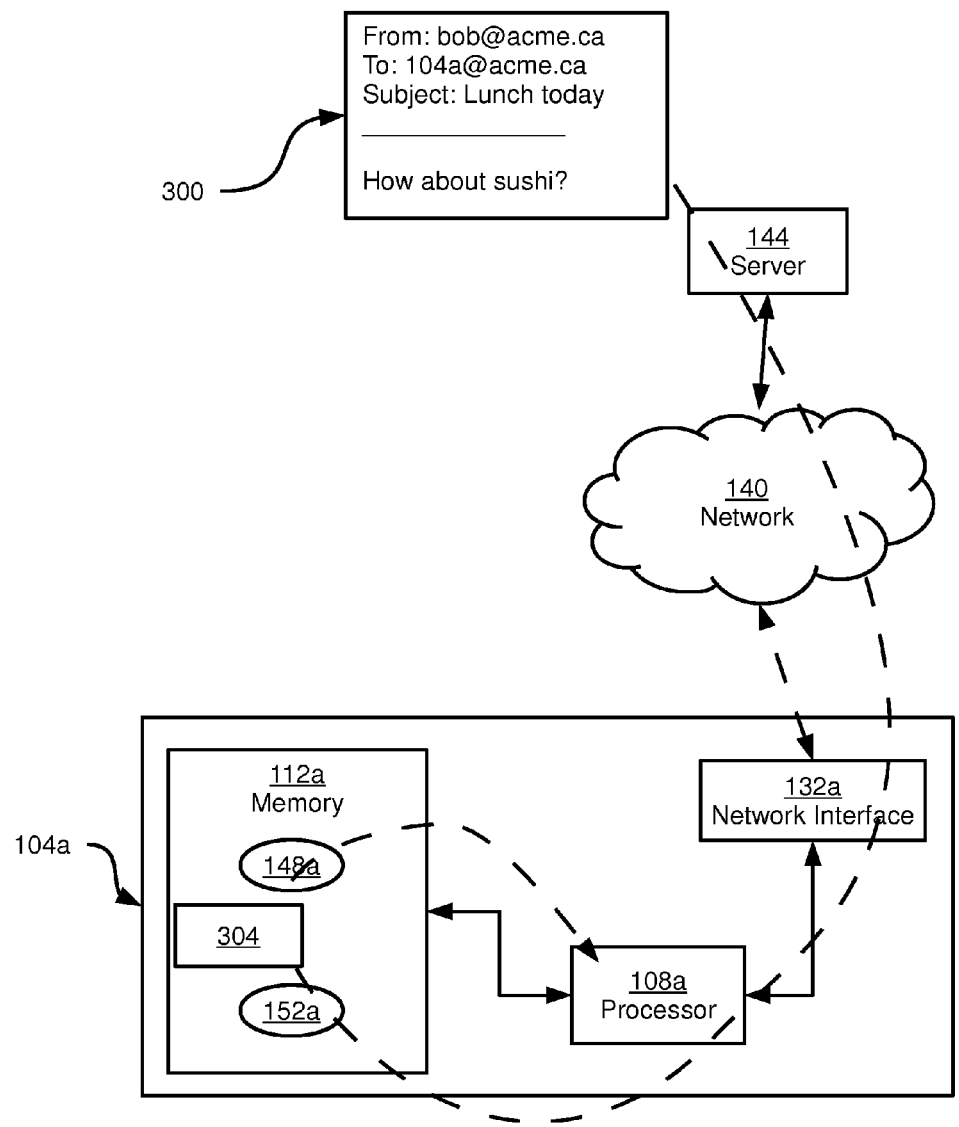
FIG. 3 depicts a performance of block 205 of the method of FIG. 2, according to a non-limiting embodiment.

More generally, notification messages indicate that an event has occurred which may necessitate the generation of an alert at device 104a via one or more output devices. Therefore, the notification message includes data defining the event (e.g. an email subject line, a calendar event subject, and the like). FIG. 3 depicts an example performance of block 205.

Referring to FIG. 3, in which certain components of device 104a have been omitted to enhance the visibility of the remaining components, an email message 300—including a sender address ("bob@acme.com"), a destination address ("104a@acme.ca"), a subject ("Lunch today") and a body ("How about sushi?")—is received at device 104a (particularly, at network interface 132a) from server 144. Processor 108a, by executing messaging application 152a, generates a notification message 304, which is detected by processor 108a via the execution of notification application 148a. In the present example, notification message 304 includes the subject line of email 300, although a variety of formats can be used for notification messages.

Returning to FIG. 2, the performance of method 200 continues at block 210. At block 210, processor 108a is configured to determine whether device 104a is a "primary" device. To perform the determination at block 210, processor 108a is configured to examine primary device indicator 156a stored in memory 112a. Briefly, if device 104a is a primary device, processor 108a will be configured to perform additional actions to influence how device 104b handles notification messages.

Figure 4:
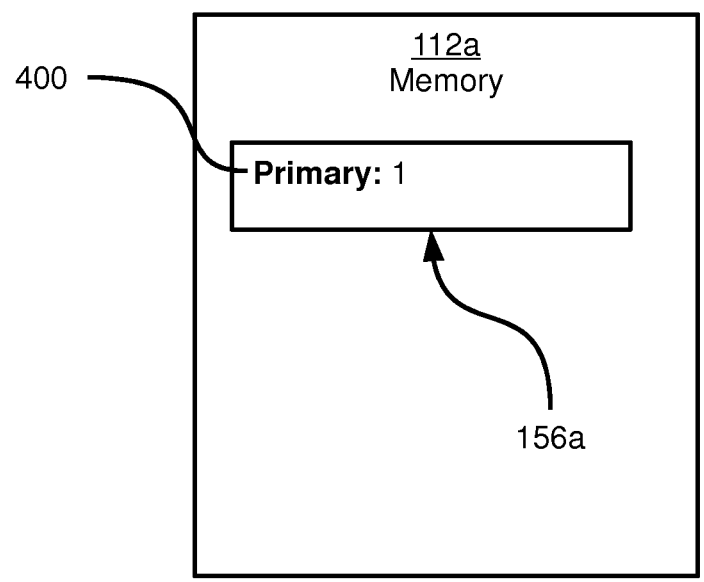
FIG. 4 depicts a primary device indicator stored in the memory of the devices of FIG. 1, according to a non-limiting embodiment.

Turning now to FIG. 4, an example primary device indicator 156a is shown. Primary device indicator 156a includes a flag 400. The value of flag 400 indicates whether or not device 104a is a primary device. In the present example, flag 400 is binary, with a value of one indicating that device 104a is primary, and a value of zero indicating that device 104a is not primary. Other formats for flag 400 are also contemplated. For example, "yes" and "no" could be used instead of one and zero. In other examples, an identifier (such as a serial number, device PIN, MSISDN and the like) could be used to identify the primary device. At block 210, therefore, processor 108a is configured to retrieve the value of flag 400 from memory 112a and to determine whether the value is positive (for example, a one or a "yes"), or whether the value matches an identifier of device 104a (for example, whether flag 400 contains the MSISDN of device 104a).

In the present example performance of method 200, the determination at block 210 is affirmative, since flag 400 has a value of one. Therefore, returning to FIG. 2, the performance of method 200 proceeds to block 215, at which processor 108a is configured to generate an alert. Processor 108a generates an alert by controlling the output devices (e.g. LED 130a) of device 104a according to alert criteria stored in memory 112a (not shown). For example, the alert generated at block 215 may be to flash LED 130a every two seconds. A wide variety of alerts and methods to select particular alerts will now occur to those skilled in the art.

Following the beginning of alert generation (it is contemplated that alert generation can continue indefinitely, or for a configurable time period, in the absence of an acknowledgment), the performance of method 200 proceeds to block 220, at which processor 108a is configured to receive an acknowledgment of the alert generated at block 215. The nature of the acknowledgment is not particularly limited. In general, the acknowledgment is received at processor 108a as input data from input device 116a and indicates that the alert generated at block 215 is no longer necessary. For example, the acknowledgment may be input data selecting the email message received from server 144 for presentation on display 120a. In response to receiving the acknowledgment, processor 108a is configured to cease generation of the alert that began being generated at block 215.

Proceeding to block 225, processor 108a is configured, in response to receiving the acknowledgment at block 220, to transmit an acknowledgment message to communication device 104b. More generally, processor 108a is configured to transmit the acknowledgment message to any other communication device associated with device 104a (meaning, as discussed above, any other communication device which receives messages for the same account maintained at server 144) that is connected to device 104a. Various methods of detecting and connecting to other associated devices at device 104a will now occur to those skilled in the art. In some examples, processor 108a can be configured to store identifiers of any discovered associated devices in memory 112a for future reference. Such identifiers can be stored in primary device indicator 156a, or in a separate file.

The acknowledgment message transmitted at block 225 includes an identification of notification message 304 detected at block 205. In other words, the acknowledgment identifies the event for which an alert is no longer needed. The nature of the identification is not particularly limited. In the present example, where notification message 304 includes the subject line of email 300, the acknowledgment message can include a unique representation such as a hash of the subject line. In other examples, the acknowledgment message can include the subject line itself, a checksum of email 300, or other identifiers that will now occur to those skilled in the art. As will be discussed below, the acknowledgment message transmitted at block 225 causes device 104b to interrupt any alerts being generated in connection with email 300.

The performance of method 200 will now be discussed in connection with its performance on device 104b. It will be assumed that the primary device indicator 156b stored in memory 112b includes a flag with a value of zero, indicating that device 104b is not a primary device. This example performance of method 200 on device 104b will be assumed to begin substantially simultaneously with the performance of method 200 of device 104a, as device 104b is assumed to receive email 300 at substantially the same time as device 104a (for example, within five seconds of the receipt of email 300 at device 104a).

The performance of block 205 at device 104b is as described above in connection with its performance at device 104a. Processor 108b is then configured to perform block 210, at which primary device indicator 156b is examined to determine whether device 104b is the primary device. In this case, the determination will be negative, as it is assumed that the flag in indicator 156b has a value of zero. Therefore, the performance of method 200 proceeds to block 230.

At block 230, processor 108b is configured to delay the generation of an alert via the output devices of device 104b in response to the notification message detected at block 205. The generation of an alert is delayed for a configurable time period. The length of the time period is not particularly limited; for example, a time period of about thirty seconds can be used. It will now be apparent to those skilled in the art that a wide variety of other time periods can also be used. Thus, more particularly, processor 108b is configured to start a delay timer at block 230.

Following the start of the delay timer, processor 108b is configured to proceed to either block 235 or block 240. Whether processor 108b performs block 235 or block 240 is determined by whether or not the delay timer initiated at block 230 expires before an acknowledgment associated with the notification message is received at device 104b. If the timer does expire (that is, if the configurable time period elapses), an alert is generated as discussed above in connection with block 215.

Whether or not the delay timer expires, when the acknowledgment message described above is transmitted by device 104a, the acknowledgment message is received at processor 108b (via network interface 132b) at block 240. In response to receiving the acknowledgment message, processor 108b is configured to interrupt any alert generation associated with the notification message detected at block 205. Thus, if the delay timer did expire (in which case an alert is being generated), processor 108b is configured to cease the alert being generated. If the delay timer has not yet expired, processor 108b is configured to terminate the delay timer without generating an alert.

Therefore, as seen above, the primary device among a plurality of associated devices can cause the other (or "secondary") devices to cease generating alerts for notification messages which have been acknowledged at the primary device, even if they have not been acknowledged at the secondary devices. Further, as will be described below, the primary device need not be fixed—either device 104a or device 104b (or, of course, any other associated device) can be the primary device at a particular time.

Figure 5:
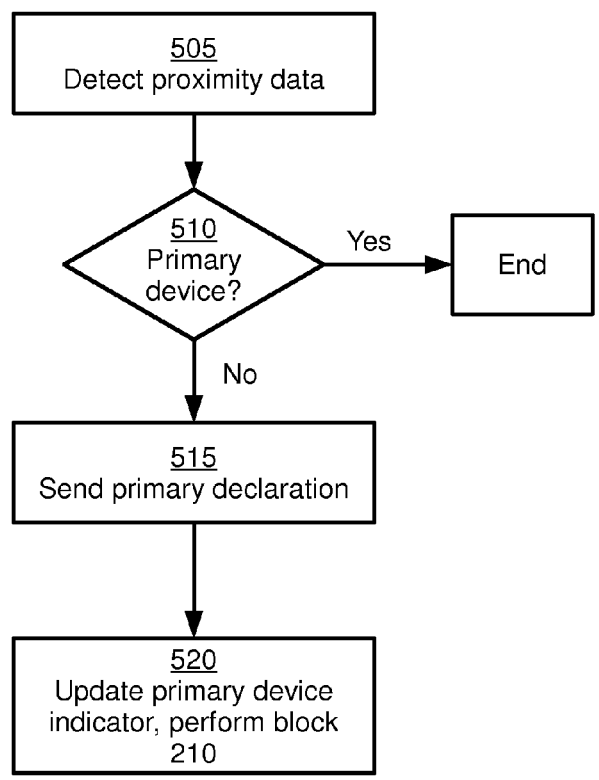
FIG. 5 depicts a method of setting a device as a primary device, according to a non-limiting embodiment.

Turning now to FIG. 5, a flowchart illustrating a method 500 for setting the primary device will be discussed. Both devices 104a and 104b can perform method 500, via the execution of applications 148a and 148b, respectively. The performance of method 500 will be discussed in connection with its performance on device 104a.

At block 505, processor 108a is configured to detect proximity data indicating that a user of device 104a is in proximity to device 104a. A variety of implementations of claim 505 are configured, which can be used alone or in any suitable combination. For example, processor 108a can be configured to detect movement of device 104a, via a GPS signal, an accelerometer or the like. Such movement may indicate that device 104a is being carried on or near the person of the user. As another example, processor 108a can be configured to detect a temperature elevation via a temperature sensor (again, this may indicate the proximity of a user). As yet another example, processor 108a can be configured to receive input data from input device 116a. In the present example performance of method 500, it will be assumed that processor 108a is configured to interpret input data received from input device 116a as an indicator of user proximity. In some embodiments, proximity can be set manually by the user, such that data detected at block 505 can include a specific command received from input device 116a, such as a certain combination of key presses or menu selection.

Having detected proximity data, processor 108a is then configured, at block 510, to determine whether device 104a is already the primary device. This is accomplished by examining primary device indicator 156a, as discussed earlier in connection with block 210. If device 104a is already the primary device, then no changes are required, and the performance of method 500 ends.

If, however, the determination at block 510 is negative (meaning that device 104a is not already the primary device), then processor 108a is configured to perform block 515 of method 500. At block 515, processor 108a is configured to transmit a primary declaration message to device 104b (and to any other associated devices that are connected to device 104a). The effect of the declaration message on device 104b will be discussed below. The form and content of the primary declaration message is not particularly limited, but generally contains an indication that device 104a is the primary device. As such, the declaration may contain an identifier (such as a serial number of MSISDN) of device 104a.

Having sent the primary declaration message at block 515, processor 108a is then configured to update primary device indicator 156a to contain a value of one, "yes", or any other value indicating that device 104a is the primary device. Processor 108a is also configured to perform method 200, beginning at block 210, for any existing notification messages stored in memory 112a. Because device 104a is now the primary device, it may be necessary to begin generating an alert for a notification message when alerting would otherwise have been delayed. A "re-assessment" of any pending notification messages is therefore performed at device 104a. This new performance of method 200 may interrupt any existing performances of method 200 at any point during such performances.

Figure 6:
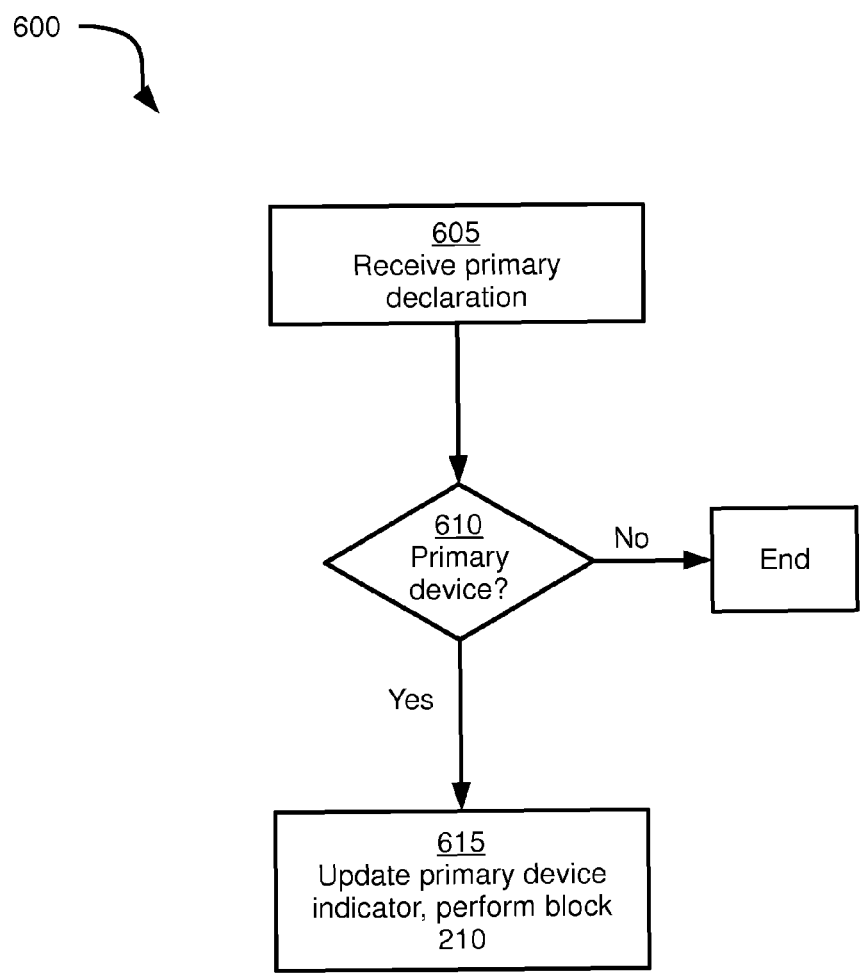
FIG. 6 depicts a method of setting a device as a secondary device, according to a non-limiting embodiment.

Turning now to FIG. 6, a flowchart illustrating a method 600 for setting a secondary device (of which there may be many) will be discussed. The performance of method 600 will be discussed in conjunction with its performance on device 104b.

At block 605, processor 108b is configured to receive, via network interface 132b, a primary declaration such as the one described above in connection with block 515. Processor 108b, having received the declaration (which, as discussed above, states that the sender is the primary device), checks whether device 104b is currently the primary device at block 610, by examining indicator 156b. If device 104b is not the primary device according to indicator 156b, then the determination at block 610 is negative, and no changes are required at device 104b. The performance of method 600 ends.

If, however, the determination at block 610 is affirmative (that is, device 104b was set as the primary device when the primary declaration was received), then processor 108b is configured to proceed to block 615. At block 615, primary device indicator 156b is updated to indicate that device 104b is not primary (for example, the updating can place a value of zero in indicator 156b). Once indicator 156b has been updated, processor 108b is configured to perform method 200, beginning at block 210, for any existing notification messages stored in memory 112a. Thus, if device 104b had previously been the primary device, the result of updating indicator 156b and performing block 210 may be to immediately cease an alert generated at a previous performance of block 215, since device 104b must now delay alert generation according to block 230.

It is contemplated that devices 104a and 104b are configured to perform methods 500 and 600 whenever, respectively, proximity data is detected and primary declarations are received. Thus, the identity of the primary device can change repeatedly, based on which device has detected proximity data most recently. It will now be apparent to those skilled in the art that in some cases, proximity data and the acknowledgment received at block 220 of method 200 will coincide—that is, the acknowledgment itself will be input data which is considered proximity data. In such cases, processors 108a and 108b can be configured to send a single message containing both the acknowledgment and the primary declaration, or can be configured to send two separate messages.

Variations to the above are contemplated. For example, rather than setting the primary device and propagating acknowledgments for all notifications, the primary device may be set separately for different categories of notification messages. For example, a different one of devices 104a and 104b may be the primary device for notification messages relating to emails than for notification messages relating to calendar events. In such examples, indicators 156a and 156b include separate flags 400 for each category of notification messages. Further, methods 500 and 600 are also performed independently for different categories of proximity data, such that certain proximity data (but not other proximity data) leads to a device declaring itself as the primary device for certain categories of notification messages (but not other categories).

In another variation, devices 104a and 104b can be configured to detect the nature of the connection between them, and to send primary declarations and acknowledgment messages over a lower-latency connection when possible. For example, if device 104a and device 104b are connected via a cellular network such as network 140, and a local WiFi link is available, such as link 142, device 104a may be configured to detect that link 142 is available and to transmit the acknowledgment message sent at block 225 over link 142.

In some examples, the delay at block 230 may also be omitted, such that the "secondary" devices begin generating alerts immediately upon receiving notification messages.

Certain advantages to the above systems and methods will now be apparent to those skilled in the art. For example, one or both of devices 104a and 104b can better manage their computational and power resources, as one or both of devices 104 will avoid generating alerts in certain situations, whether devices 104 are physically located near to each other (e.g. in the same room) or relatively distant from each other (e.g. in different cities).

Those skilled in the art will appreciate that in some embodiments, the functionality of processors 108a and 108b executing the applications described above may be implemented using pre-programmed hardware or firmware elements (e.g., application specific integrated circuits (ASICs), electrically erasable programmable read-only memories (EEPROMs), etc.), or other related components.

Persons skilled in the art will appreciate that there are other alternative implementations and modifications, and that the above implementations and examples are only illustrations of one or more embodiments. The scope, therefore, is only to be limited by the claims appended hereto.

I claim:

1. A method in a communication device having a processor, a memory, an input device and an output device, the method comprising:
   detecting a notification message at the processor indicating that a new message has been received at the communication device from a server;
   storing a primary device indicator in the memory;
   responsive to detecting the notification message, determining, at the processor of the communication device, whether the communication device is a primary device, wherein determining whether the communication device is a primary device includes examining the primary device indicator at the processor; and,
   when the determination is affirmative:
      controlling the output device with the processor to generate an alert;
      responsive to generating the alert, receiving an acknowledgement of the alert at the processor from the input device; and
      responsive to receiving the acknowledgement, transmitting an acknowledgment message from the communication device to an other communication device for causing the other communication device to interrupt alert generation and ceasing generation of the alert at the output device.

2. The method of claim 1, further comprising:
   detecting proximity data indicating that a user is in proximity to the communication device at the processor and in response, transmitting a primary declaration message to the other device; and
   updating the primary device indicator in the memory to set the communication device as the primary device.

3. The method of claim 1, further comprising:
   when the determination is negative:
      at the processor, starting a delay timer for delaying, for a period of time, generation of an alert by the output device in association with the notification message; and
      interrupting alert generation in response to an acknowledgement message received from the primary device.

4. The method of claim 3, further comprising:
   when the delay timer expires prior to receiving the acknowledgment message, controlling the output device to generate an alert.

5. A communication device, comprising:
   a memory storing a primary device indicator;
   an input device;
   an output device; and
   a processor interconnected with the memory, the input device and the output device; the processor configured to:
      detect a notification message indicating that a new message has been received at the communication device from a server;
      responsive to detecting the notification message, determine whether the communication device is a primary device by examining the primary device indicator;
      when the determination is affirmative:
         control the output device to generate an alert;
         responsive to generating the alert, receive an acknowledgement from the input device; and responsive to receiving the acknowledgement, transmit an acknowledgment message to an other communication device for causing the other communication device to interrupt alert generation and cease generation of the alert at the output device.

6. The communication device of claim 5, the processor further configured to:
   detect proximity data indicating that a user is in proximity to the communication device and in response, transmit a primary declaration message to the other device; and
   update the primary device indicator to set the communication device as the primary device.

7. The communication device of claim 5, the processor further configured to:
   when the determination is negative:
      start a delay timer for delaying, for a period of time, generation of an alert by the output device in association with the notification message; and
      interrupt alert generation in response to an acknowledgement message received from the primary device.

8. The communication device of claim 7, the processor further configured to:
   when the delay timer expires prior to receiving the acknowledgment message, control the output device to generate an alert.

9. A non-transitory computer readable medium storing computer readable instructions executable by a processor of a communication device having a memory, an input device and an output device, for performing a method comprising:
   detecting a notification message at the processor indicating that a new message has been received at the communication device from a server;
   storing a primary device indicator in the memory;
   responsive to detecting the notification message, determining, at the processor of the communication device, whether the communication device is a primary device, wherein determining whether the communication device is a primary device includes examining the primary device indicator at the processor; and,
   when the determination is affirmative:
      controlling the output device with the processor to generate an alert;
      responsive to generating the alert, receiving an acknowledgement of the alert at the processor from the input device; and
      responsive to receiving the acknowledgement, transmitting an acknowledgment message from the communication device to an other communication device for causing the other communication device to interrupt alert generation and ceasing generation of the alert at the output device.

10. The non-transitory computer readable medium of claim 9, the method further comprising:
    detecting proximity data indicating that a user is in proximity to the communication device at the processor and in response, transmitting a primary declaration message to the other device; and
    updating the primary device indicator in the memory to set the communication device as the primary device.

11. The non-transitory computer readable medium of claim 9, the method further comprising:
    when the determination is negative:
       at the processor, starting a delay timer for delaying, for a period of time, generation of an alert by the output device in association with the notification message; and
       interrupting alert generation in response to an acknowledgement message received from the primary device.

12. The non-transitory computer readable medium of claim 11, the method further comprising:
    when the delay timer expires prior to receiving the acknowledgment message, controlling the output device to generate an alert.

13. A communication device, comprising:
    a memory storing a primary device indicator;
    an input device;
    an output device; and
    a processor interconnected with the memory, the input device and the output device; the processor configured to:
       connect to an other device over a first connection;
       detect a notification message indicating that a new message has been received at the communication device from a server;
       responsive to detecting the notification message, determine whether the communication device is a primary device by examining the primary device indicator;
       control the output device to generate an alert;
       responsive to generating the alert, receive an acknowledgement of the alert from the input device;
       determine, at the processor that a second connection to the other device is available, the second connection having a lower latency than the first connection; and
       transmit an acknowledgment message from the communication device to the other communication device over the second connection, for causing the other communication device to interrupt alert generation, and cease generation of the alert at the output device.

* * * * *